(12) United States Patent
Moore et al.

(10) Patent No.: US 12,190,298 B1
(45) Date of Patent: Jan. 7, 2025

(54) REPRESENTATION OF PAYMENT CARDS IN METAVERSE

(71) Applicant: Wells Fargo Bank, N.A., San Francisco, CA (US)

(72) Inventors: Craig Moore, St. Louis, MO (US); Paul W. Mussell, Minneapolis, MN (US); Aparna M. Dave, Houston, TX (US); Eileen S. Dunlap, Charlotte, NC (US); Carrie Anne Hanson, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 145 days.

(21) Appl. No.: 18/057,430

(22) Filed: Nov. 21, 2022

(51) Int. Cl.
*G06Q 20/06* (2012.01)
*G06Q 20/36* (2012.01)
*G06Q 20/38* (2012.01)

(52) U.S. Cl.
CPC .......... *G06Q 20/065* (2013.01); *G06Q 20/36* (2013.01); *G06Q 20/389* (2013.01); *G06Q 2220/165* (2013.01)

(58) Field of Classification Search
CPC .... G06Q 20/065; G06Q 20/36; G06Q 20/389; G06Q 2220/165
See application file for complete search history.

(56) References Cited

U.S. PATENT DOCUMENTS

| | | | |
|---|---|---|---|
| 11,443,838 B1 * | 9/2022 | Cordonnier | G16H 10/65 |
| 11,501,297 B1 * | 11/2022 | Tai | G06Q 20/20 |

(Continued)

FOREIGN PATENT DOCUMENTS

| | | |
|---|---|---|
| IN | 202141055732 | 1/2022 |
| TR | 2021/017692 | 1/2022 |

(Continued)

OTHER PUBLICATIONS

Regner et al.: NFTs in Practice: Non-Fungible Tokens as Core Component of a Blockchain-based event Ticketing Application, 2009 , 40th International Conference on Information systems, Munich 2009, pp. 1-17 (Year: 2009).*

(Continued)

*Primary Examiner* — Bijendra K Shrestha
(74) *Attorney, Agent, or Firm* — Merchant & Gould P.C.

(57) ABSTRACT

A computer system for implementing a non-fungible token (NFT) as a payment object in a metaverse space. The system includes one or more processors and non-transitory computer-readable storage media encoding instructions which, when executed by the one or more processors, causes the computer system to create: a mint engine programmed to generate an NFT having a unique visual appearance, the NFT being associated with a currency account and including an authorization credential for the currency account; a ledger engine programmed to maintain the NFT on a ledger; a wallet engine programmed to generate a presentation of the NFT in response to a user request, wherein the presentation includes the visual appearance of the NFT to provide a visual representation of the authorization credential; and a transaction engine programmed to access the currency account, based on the authorization credential, in response to a payment request.

20 Claims, 5 Drawing Sheets

(56) References Cited

U.S. PATENT DOCUMENTS

| | | | | |
|---|---|---|---|---|
| 2022/0114600 A1* | 4/2022 | Blackburn | ......... | G06Q 20/1235 |
| 2023/0169578 A1* | 6/2023 | Krishna | ............. | G06Q 30/0625 |
| | | | | 705/27.1 |
| 2023/0177490 A1* | 6/2023 | Moore | ............... | G06Q 20/3827 |
| | | | | 705/66 |
| 2024/0113895 A1* | 4/2024 | Wang | .................... | H04L 9/3247 |
| 2024/0181349 A1* | 6/2024 | Lee | ......................... | A63F 13/35 |

FOREIGN PATENT DOCUMENTS

| | | | | |
|---|---|---|---|---|
| TW | M627535 | | 5/2022 | |
| WO | 2021246498 A1 | | 12/2021 | |
| WO | WO-2022204404 A1 * | 9/2022 | ............. | G06F 21/10 |
| WO | WO-2022225103 A1 * | 10/2022 | ........... | A63F 13/216 |

OTHER PUBLICATIONS

Regner et al.: NFTs in Practice: Non-Fungible Tokens as Core Component of a Blockchain-based Event Ticketing Application, 2019 , 40th International Conference on Information Systems, Munich 2019, pp. 1-17 (Year: 2019).*

Strotz, Misch: NFTs as Keys: Web3 Authentication in the Pseudonymous Economy, Jul. 18, 2021, Medium, pp. 1-20 (Year: 2021).*

Cummings, Ashley R.: Fashion, NFTs & Metaverse—Oh My! Feb. 7, 2022, BankNotes, pp. 1-17 (Year: 2022).*

Fonarov, Oleg: What is the Role of NFTs in the Metaverse, Mar. 11, 2022, Forbes, pp. 1-9 (Year: 2022).*

* cited by examiner

REPRESENTATION OF PAYMENT CARDS IN METAVERSE

BACKGROUND

The metaverse can be envisioned as an immersive world that is typically facilitated through the use of virtual and augmented reality devices. The metaverse can include a virtual representation of most, if not all, aspects of the physical work in which we live. Because the entire concept of metaverse interaction is relatively new, it is unclear how metaverse interactions, such as purchase and payment, might be effectively implemented.

SUMMARY

Examples provided herein are directed to a computer system for implementing a non-fungible token (NFT) as a payment object in a metaverse space. The system includes one or more processors and non-transitory computer-readable storage media encoding instructions which, when executed by the one or more processors, causes the computer system to create a mint engine programmed to generate an NFT having a unique visual appearance, the NFT being associated with a currency account and including an authorization credential for the currency account; a ledger engine programmed to maintain the NFT on a ledger; a wallet engine programmed to generate a presentation of the NFT in response to a user request, wherein the presentation includes the visual appearance of the NFT to provide a visual representation of the authorization credential; and a transaction engine programmed to access the currency account, based on the authorization credential, in response to a payment request.

According to one aspect, the NFT is a digital representation of a physical object owned by the user. According to another aspect, the ledger is a blockchain ledger. According to yet another aspect, the NFT is further associated with one or more payment preferences. According to a further aspect, the transaction engine is further programmed to access the one or more payment preferences and to respond to the payment request in accordance with the one or more payment preferences.

According to another aspect, the transaction engine is further programmed to convert currencies between a first currency associated with the payment request and a second currency associated with the currency account. According to still another aspect, the mint engine is further programmed to generate a key NFT, the key NFT being associated with a metaverse space and including access credentials for the metaverse space. According to a further aspect, the transaction engine is further programmed to permit an avatar associated with the key NFT to access the metaverse space based on the access credentials.

According to another aspect, the transaction engine is further programmed to maintain a record of transactions associated with the NFT. According to yet another aspect, the presentation of the NFT is visible only to a user having ownership of the NFT. According to still another aspect, the system further includes an auxiliary engine programmed to identify transactional benefits associated with the NFT. According to a further aspect, the transactional benefits associated with the NFT are further associated with a particular purchase.

Examples provided herein are further directed to a method for implementing a non-fungible token (NFT) as a payment object in a metaverse space. The method includes receiving, from a user in the metaverse, a request to access a wallet associated with the user; generating a presentation of contents of the wallet, wherein the contents of the wallet include at least one NFT, the at least one NFT having a unique visual appearance and being associated with a currency account and including an authorization credential for the currency account, wherein the presentation includes the visual appearance of the NFT to provide a visual representation of the authorization credential; receiving, from the user, a selection of the at least one NFT; receiving a payment request including the at least one NFT; and authorizing payment of the payment request from the currency account based on the authorization credential.

According to an aspect, the currency account is one of a digital currency account or a fiat currency account. According to a further aspect, the payment request is associated with one of a digital currency or a fiat currency. According to another further aspect, the payment request is associated with a digital currency and the currency account is a fiat currency account and the method further includes converting the fiat currency to the digital currency. According to another aspect, the method further includes retrieving the at least one NFT from a ledger, in response to receiving a selection of the at least one NFT. According to another aspect, the contents of the wallet include at least two NFTs, wherein one of the at least two NFTs is a key NFT, wherein the key NFT is associated with a metaverse space and include an access credential for the metaverse space.

Examples provided herein are further directed to a system including a computer-readable memory storing executable instructions and one or more processors in communication with the computer-readable memory, wherein, when the one or more processors execute the executable instructions, the one or more processors perform receiving, from a user in the metaverse, a request to access a wallet associated with the user; generating a presentation of contents of the wallet, wherein the contents of the wallet include at least one NFT, the at least one NFT having a unique visual appearance and being associated with a currency account and including an authorization credential for the currency account, wherein the presentation includes the visual appearance of the NFT to provide a visual representation of the authorization credential; receiving, from the user, a selection of the at least one NFT; receiving a payment request including the at least one NFT; and authorizing payment of the payment request from the currency account based on the authorization credential.

The details of one or more techniques are set forth in the accompanying drawings and the description below. Other features, objects, and advantages of these techniques will be apparent from the description, drawings, and claims.

DETAILED DESCRIPTION

Figure 1:
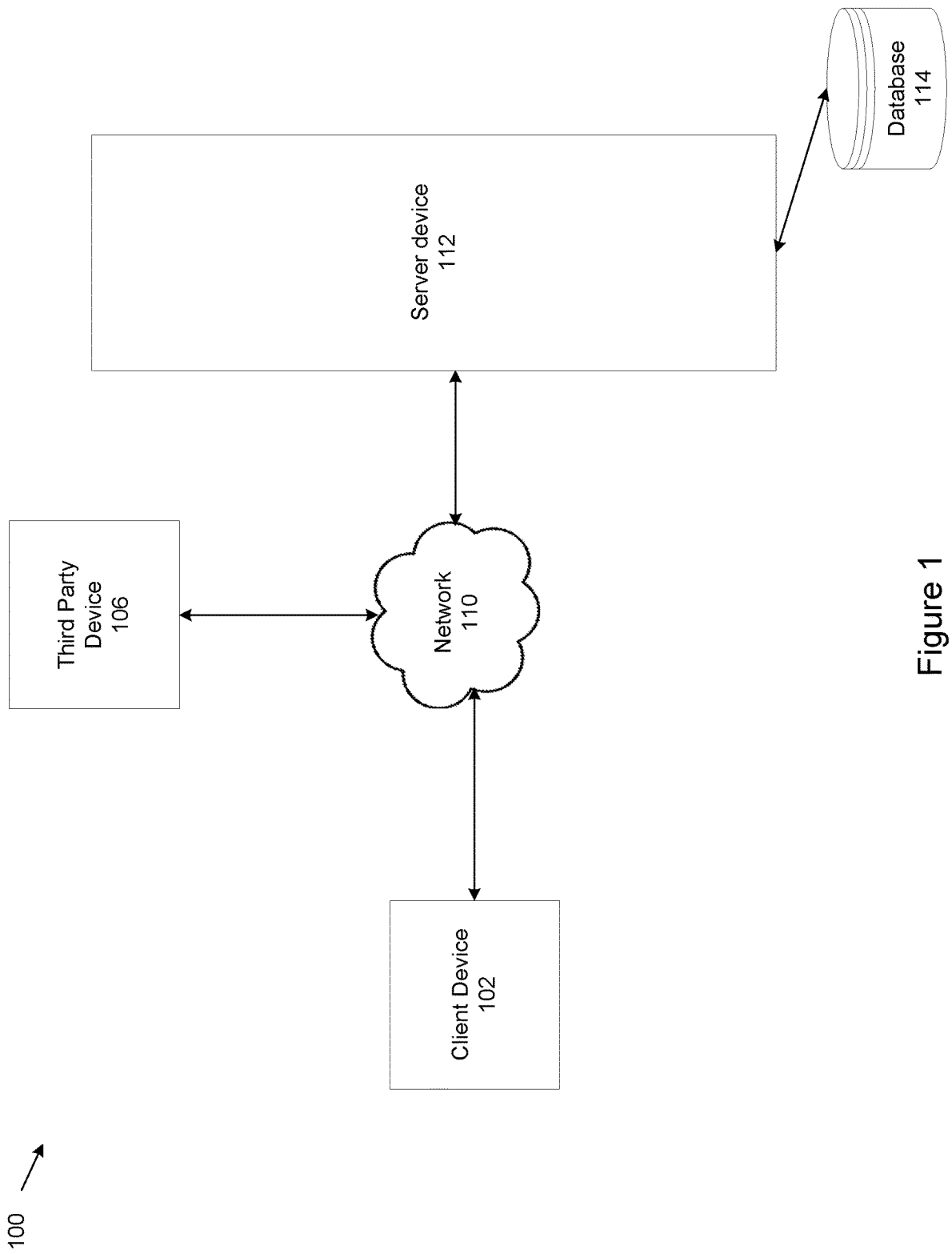
FIG. 1 shows an example system for using non-fungible tokens to represent payment cards.

This disclosure relates to using non-fungible tokens (NFTs) to represent and enable payment cards and other payment objects within the metaverse.

NFTs are cryptographic assets, typically represented on a ledger such as a blockchain, with unique identification codes and metadata that distinguish them from each other. An NFT generally cannot be copied, substituted, or subdivided, and therefore can provide certification of authenticity and ownership. NFTs commonly contain references to digital files, such as images, videos, or audio files, but can be made to reference other types of digital files or digital or physical objects. Thus, an NFT can be understood as a unit of data which can be associated with a particular digital or physical asset.

Disclosed herein are systems and methods enabling the use of NFTs as representations of payment cards and other payment objects in the metaverse. The disclosed systems and methods may further enable only a specific NFT owner or authorized user to utilize proprietary skins or digital artwork overlaid onto other articles (e.g., a payment card) to visually represent authorization to use those articles. An NFT may be used to represent entirely new proprietary articles (e.g., uniquely designed items) that may have corresponding uses within the metaverse (e.g., a key having a particular shape that can unlock a metaverse "lock").

The NFTs may be hosted on a trusted ledger, such as a blockchain, and the metaverse platform provider may detect the ownership of the NFT via the ledger. Upon request by an individual within the metaverse to utilize the content of the NFT, the provider may authenticate whether the requesting individual is the owner or an approved user of the NFT, and then either approve or deny the requested use of the NFT. Accordingly, when other parties within the metaverse view an avatar using a particular NFT content, those parties may be able to implicitly trust that the avatar displaying the NFT content is authorized to use that NFT content.

For example, when an avatar reveals a virtual payment card having unique credentials associated with a particular individual, the other entities within the metaverse viewing or otherwise detecting the credentials may sell articles to that avatar and initiate a charge using the unique credentials. In another example, an avatar of a service provider may present a validation or membership certificate, showing the avatar is associated with a vetted service.

Beyond enabling card-based transactions, when using NFTs to represent all of an individual's payment cards, the metaverse environment may be used to provide an easy way for users to select which cards to present for a transaction. For instance, in response to a card-selection command submitted by a user, an augmented reality display may be provided within the virtual world depicting, to only the user who provided the card-selection command, the content (e.g., a virtual image) of each NFT, such as in a carousel-style display, enabling the user to select which card to utilize. Following selection, the NFT content may be presented to the counterparty to the transaction in the manner described above.

Furthermore, in addition to presenting the NFT content, rewards-related recommendations may be provided to the user in a similar augmented reality (AR)-style overlay within the virtual world. The rewards-related recommendations may be related to the articles to be purchased.

In examples described herein, a protocol and underlying technology for using NFTs to represent and enable payment is provided. There can be various advantages associated with the technologies described herein. For instance, implementing NFTs as payment objects in the metaverse simplifies and increases financial security for users making payments in the metaverse. Further, implementing NFTs as payment objects integrates authorization features directly in the payment object.

FIG. 1 schematically shows aspects of one example system 100 programmed to implement NFTs as payment objects in the metaverse. In this example, the system 100 can be a computing environment that includes a plurality of client and server devices. In this instance, the system 100 includes client device 102, a third party device 106, a server device 112, and a database 114. The client device 102 and the third party device 106 can communicate with the server device 112 through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

For instance, in some examples, the devices are virtual and/or augmented reality devices that facilitate the creation of a metaverse in which individuals can interact. The metaverse can be an immersive world that is facilitated through the use of the virtual and augmented reality devices. Examples of such devices include virtual and/or augmented reality headsets that provide a three-dimensional experience associated with the metaverse, such as: Google Glass, Microsoft Halo, Meta Quest, Sony PlayStation VR, Valve Index VR, HTC Vive Pro, or HP Reverb.

In example embodiments, the client device 102 connects to the metaverse, which is typically a cloud-based platform. Non-limiting examples of metaverse platforms include Decentraland from The Decentraland Foundation and Sandbox from TSB Gaming Ltd. Many other existing and future metaverses are also applicable.

In some examples, an individual can enter and interact within the metaverse using a virtual representation of themselves. This representation is referred to as an avatar, which is an icon or figure representing the individual. The avatar can be used to interact within the metaverse and can have certain preferences, settings, and options associated therewith.

The example client device 102 is programmed to accept entry of authentication and ownership information from a user. Client device 102 may receive and transmit authentication data to identify a user and enable that user to access their owned or authorized NFTs. Such authentication data may also be received during a generating or minting process for the NFT to establish ownership or other authorization rights in associated with the NFT.

Client device 102 may receive and transmit design data, enabling a user to design their own customized or personalized NFT. Design data may include an image or description of a physical object which the NFT will replicate. For example, a user may scan or otherwise present a physical credit card used for currency transactions in the real world from their client device so that a NFT may be generated replicating that credit card to be used for currency transactions in the metaverse.

Design data may include original design choices or characteristics chosen or developed by the user specifically for the design of the NFT. For example, a user may use their client device 102 to access a design studio or other program to select or generate design features for a metaverse card or other payment object, which may then be minted into an NFT.

The example third party device 106 is programmed to provide metaverse services to metaverse users, such as a user associated with example client device 102. In embodiments, third party device 106 may be associated with a client services company or entity. Client services may include retailers and/or service providers.

Third party device 106 may be programmed to design and maintain metaverse retail spaces and other commercial spaces. For example, third party device 106 may provide metaverse storefronts, sales avatars, and digital goods. In embodiments, digital goods may correspond to real-world physical good which may be purchased in the metaverse and delivered to a user's physical address in the real world.

Client services may be identified by an NFT. For example, for a service provider who has been vetted or validated, the service provider may present an NFT in the form of a card or certificate which demonstrates the service providers vetted credentials to clients and potential clients.

The example server device 112 is programmed to coordinate metaverse access by clients and third parties. Server device 112 may communicated with both client device 102 and third party device 106. Server device 112 may implement input from client device 102 and third party device 106. For example, third party device 106 may initiate a sales transaction with client device 102, based on the avatar of a user associated with client device 102 presented an NFT payment object for a purchase. Server device 112 coordinates the sales transaction by validating the credential of client device 102 and transmitting the payment to the third party device 106.

In some non-limiting examples, the server device 112 is owned by a financial institution, such as a bank. The client device 102 and the third party device 106 can be programmed to communicate with the server device 112 to implement an NFT as a payment object. Many other configurations are possible.

The example database 114 is programmed store NFTs along with design and authentication data. Each stored NFT may be associated with one or both of an owner and a real-world object and/or a design profile identifying one or more unique design characteristics of the NFT.

The network 110 provides a wired and/or wireless connection between the client devices 102, 104, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
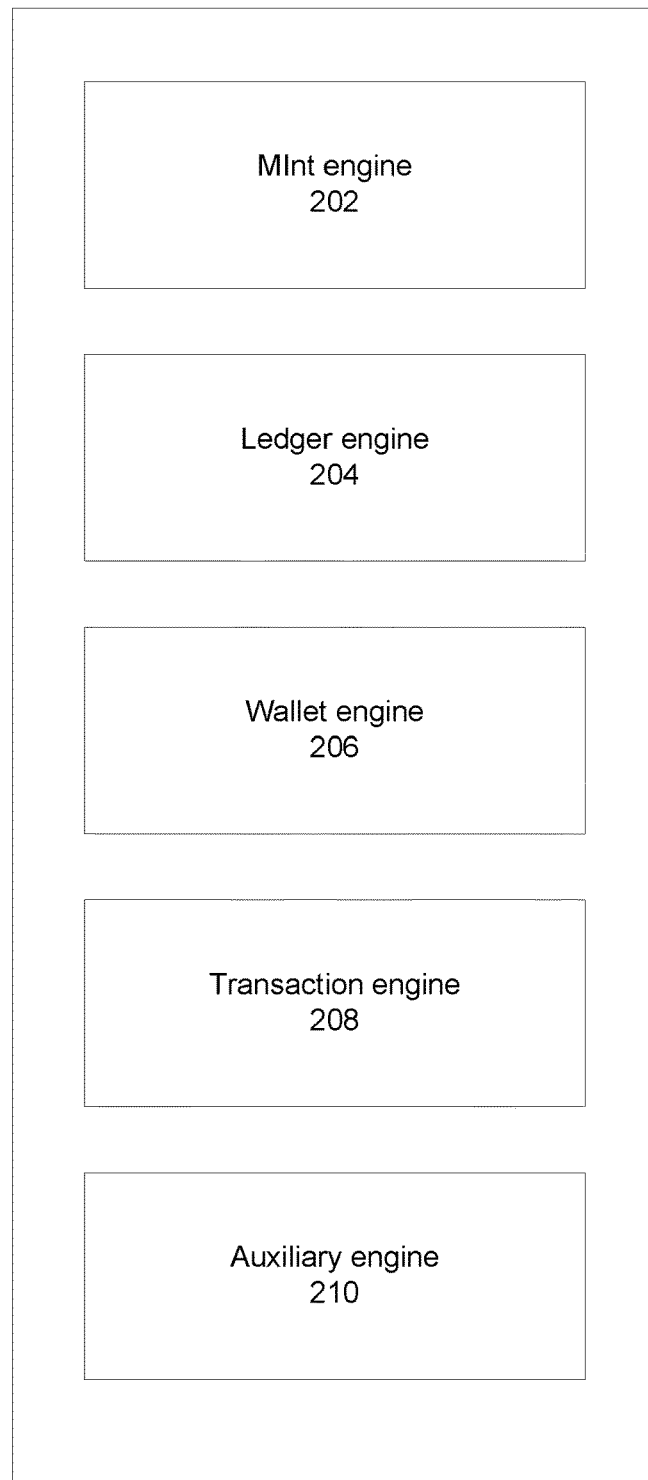
FIG. 2 shows example logical components of a server device of the system of FIG. 1.

Referring now to FIG. 2, additional details of the server device 112 are shown. In this example, the server device 112 has various logical modules that assist in generating NFTs and implementing the generated NFTs as payment objects. The server device 112 can, in this instance, include a mint engine 202, a ledger engine 204, a wallet engine 206, a transaction engine 208, and an auxiliary engine 210. In other examples, more or fewer engines or modules providing different functionality can be used.

Mint engine 202 is programmed to mint an NFT by publishing a unique digital asset to a ledger, such as a blockchain. The NFT may be a tokenized digital version of a physical real-world object, a tokenized version of another digital object, or a token of a unique digital object.

Mint engine 202 may further programmed to project a viewable digital version of the token in the metaverse. The projection of the NFT may be a mirror to the original tokenized object. The projection of the NFT may be a unique design chosen or created by the user specifically to serve as the payment object for a particular currency account. The projection of the NFT may be associated with the avatar associated with user who owns the NFT, such that the avatar can carry or present the NFT as a payment object within metaverse spaces.

Ledger engine 204 is programmed to maintain a record of minted and owned NFTs on a ledger. In embodiments, ledger engine 204 may be programmed to maintain a record of alternative payment objects, or to tokenize alternative payment objects and maintain an NFT of the alternative payment object. The ledger may be stored on a database, such as database 114 of FIG. 1, or otherwise maintained. Ledger engine 204 may be implemented as a blockchain ledger.

In examples, the associated currency account and/or identifying access information and credentials may not be stored in the ledger with the NFT but may be stored separately, such as in a separate database with the NFT instead being stored with location data for the associated currency account and/or identifying access information. The NFT maintained on the ledger by ledger engine 204 may provide proof of ownership or authorization to access a currency account associated with the NFT.

Wallet engine 206 is programmed to organize and provide access to payment objects for a particular user. A user may generally have multiple payment objects associated with different payment means or accounts. Wallet engine 206 maintains a record of individual payment objects and may further include status information for accounts associated with the payment objects. For example, a user may have one or more credit accounts, or one or more currency accounts (e.g., checking account, savings account, etc.) and may desire to have an associated payment object for each account. A user may have various currency transfer services (e.g., PayPal, Venmo, etc.) for which the user has an associated payment object to support use of and access to that account while the user is active in the metaverse.

Wallet engine 206 is further programmed to provide a projection of available NFT or other payment objects to a user. For example, a user may request to access their wallet, such as with a verbal or gesture command, and, in response, wallet engine 206 presents a projection of one or more contents of the wallet to the user. The projection of the wallet contents may be viewable only the user or may be a shared view with other avatars in the space.

Transaction engine 208 is programmed to receive and respond to transaction and payment requests including an NFT as a payment object. Responding to a payment request may generally involve finding one or more credentials associating with the payment object included in the payment request, and identifying an account associated with the payment object. Transaction engine 208 may verify the credentials or submit the credential for verifications, such as to the financial institution or service which maintains to associated account. Once the credentials are verified and access is accordingly authorized, funds may be transferred in response to the payment request.

Transaction engine 208 is further programmed to maintain a record of payment transactions carried out. This record may provide proof of purchase information as necessary, such as for a return. In examples, a user may make a purchase in the metaverse for a physical object in the real world. The user may need to show proof of purchase when picking up or receiving a delivery of the object. The record may provide a means for the user to track ongoing or periodic charges, such as subscriptions. The record provides the user with centralized tracking of where payments for various subscriptions are drawn from. Transaction engine 208 may communicate with wallet engine 206 to provide a user with centralized management Transaction engine 208 may be further configured to convert between currencies in a transaction. For example, a payment request may be received requesting a particular amount in a cryptocurrency. The payment request includes an NFT associated with a currency account. The currency account is for a form of fiat currency. Transaction engine 208 may identify the particular cryptocurrency associated with the payment request and the particular fiat currency associated with the currency account. Transaction engine 208 converts the requested amount of the cryptocurrency to a corresponding amount of the fiat currency and withdraws the appropriate amount of the fiat currency. Transaction engine 208 converts the withdrawn fiat currency into the corresponding amount of the cryptocurrency associated with the payment request and transmits as a response to the payment request. Transaction engine 208 enable ready exchange between different currency systems per transaction.

Transaction engine 208 may be configured to carry out a transaction with more than one payment object. For example, if multiple users are splitting the cost of a purchase or if a user wants to divide the cost of a purchase among more than one currency account.

In embodiments, a user may have particular payment preferences or status information associated with a particular currency account. Transaction engine 208 is programmed to access such preference or status information and execute transactions accordingly. A user's preferences may be associated with the NFT payment object, such as on the ledger by ledger engine 204.

Auxiliary engine 210 is programmed to maintain a record of points accumulated with rewards programs associated with a payment object or a currency account. For example, many credit accounts provide "points" to users for various types of transactions, or retailer specific credit or prepaid accounts, e.g., gift cards, may track a number or purchases.

Auxiliary engine 210 may communicate with wallet engine 206 to provide information about points or other benefits to a user when the user views the contents of their wallet. For example, wallet engine 206 may generate a presentation of the contents of the wallet as a "fan-out" of the NFTs or other payment objects in the contents. Auxiliary engine 210 communicates with wallet engine 206 to provide information about benefits programs of the various accounts associated with the payment objects in the wallet, and further may provide account specific information of the user's status in the various benefits programs.

Auxiliary engine 210 indicates transactional benefits associated with each currency account which may be included in the projection of the contents. In embodiments, a user may access their wallet in reference to a particular purchase or potential purchase. For example, a user may visit a retail space in the metaverse and interact with an object available for purchase.

The user may access their wallet during this interaction and, in response, auxiliary engine 210 provides information indicating the particular benefits of using each payment object to purchase the particular object available for purchase. For example, one payment object may be associated with an account that offers double or triple points when objects of a particular type are purchased using that account. Another payment object may be associated with a discount available when the associated account is used to make purchases from a particular retailer.

Auxiliary engine 210 is further programmed to provide access to assistance or other customer services associated with a particular payment object or currency account. For example, auxiliary engine 210 may maintain data for customer service or help lines, and make this information available to the user in the event of an issue with the payment object or currency account. In embodiments, auxiliary engine 210 may provide a virtual assistant the user.

Figure 3:
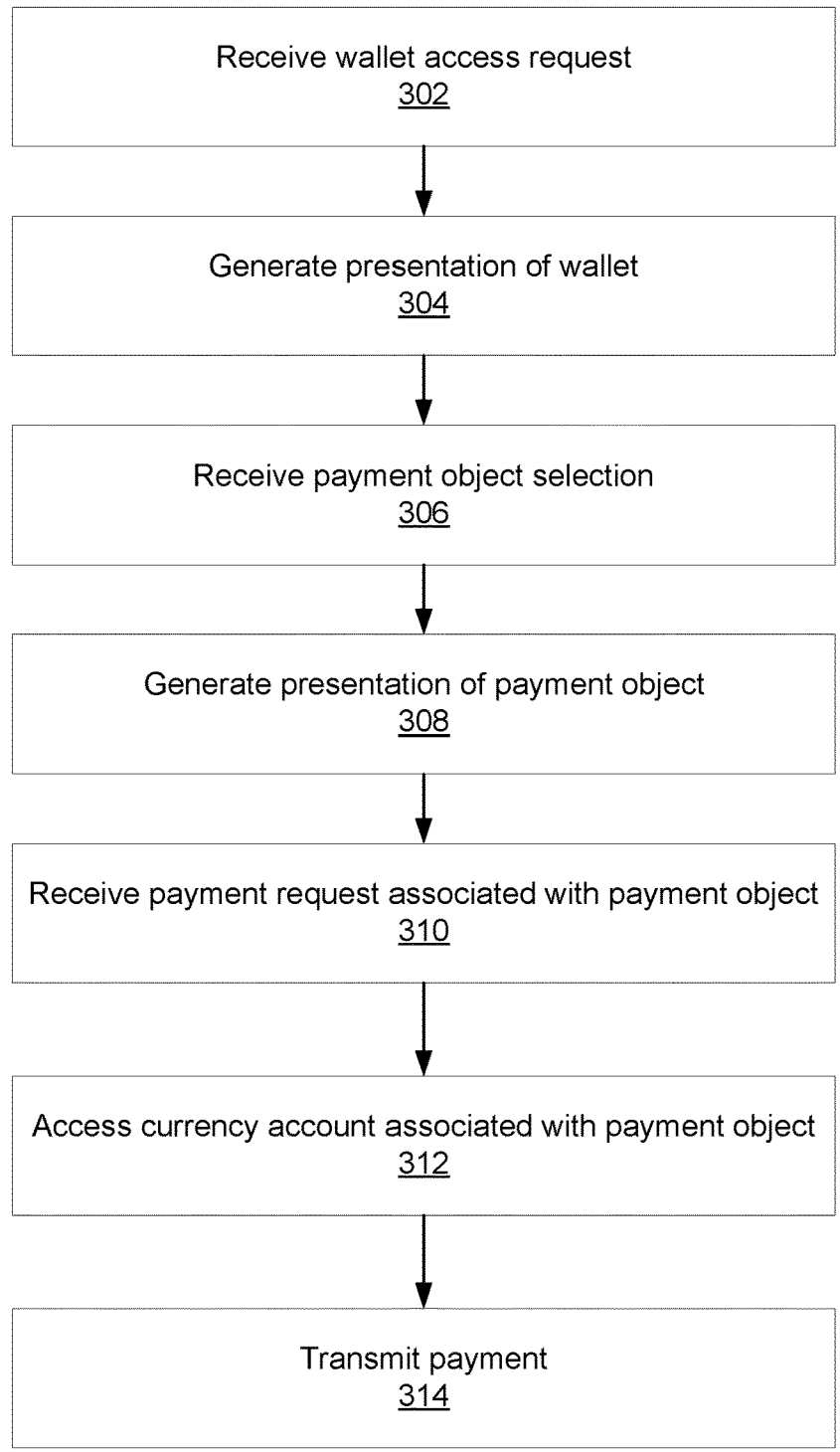
FIG. 3 shows an example workflow performed by the server device of FIG. 2.

Referring now to FIG. 3, an example method 300 of implementing an NFT as a metaverse payment object is illustrated. Method 300 may be executed by a server, such as server device 112 of FIGS. 1 and 5.

At 302, a wallet access request is received from a user in the metaverse. A user may initiate a wallet access request by a verbal or other command, such as by a command gesture executed by an avatar associated with the user.

At 304, a representation of the wallet is generated. The representation may include some or all of a contents of the wallet. The contents may include one or more payment objects. In embodiments, users may have the option to store additional objects in the wallet, such as passwords or a photo album. One or more payment objects within the contents of the wallet may be an NFT payment object. An NFT payment object may be a NFT associated with a currency account and including one or more credentials for authorizing charges to the currency account. The NFT may be a digital representation in the metaverse of a user's ownership or access rights to a particular account.

The presentation generated by the wallet may be private to the user. The user may choose to view their wallet is a public metaverse space and the presentation of the wallet contents is made viewable to the user but not to other users in the same metaverse space.

At 306, a selection of the payment object is received. The user may select a particular payment object may gesture or voice command. In embodiments, the user may select more than one payment objects for a particular transaction.

At 308, a representation of the payment object is generated. The NFT may be a digital representation in the metaverse of a user's rights to access a particular means of payment. In embodiments, the NFT provides a visual representation of the user's authorization to access a particular account to systems or other users in the metaverse. The representation of the NFT may be generally viewable to any users sharing the metaverse space or may be viewable only between the user presenting the NFT and the service provider performing the transaction. In embodiments, the NFT or other payment object may be viewable only the user, who introduces the NFT into a payment system which includes the NFT identifier with the payment request without any other users being able to view the NFT.

At 310, a payment request including the selected payment object is received. The user or a retailer may initiate the transaction. A transaction will generally identify a good or service to be purchased at a particular price and will generate a payment request for that amount. A transaction may be initiated, for example, by a scanning an object to be purchased.

At 312, the currency account associated with the payment object is accessed. One or more credentials associated with the NFT or other payment object enable the system to retrieve an authorized payment amount from an associated currency account.

Figure 4:
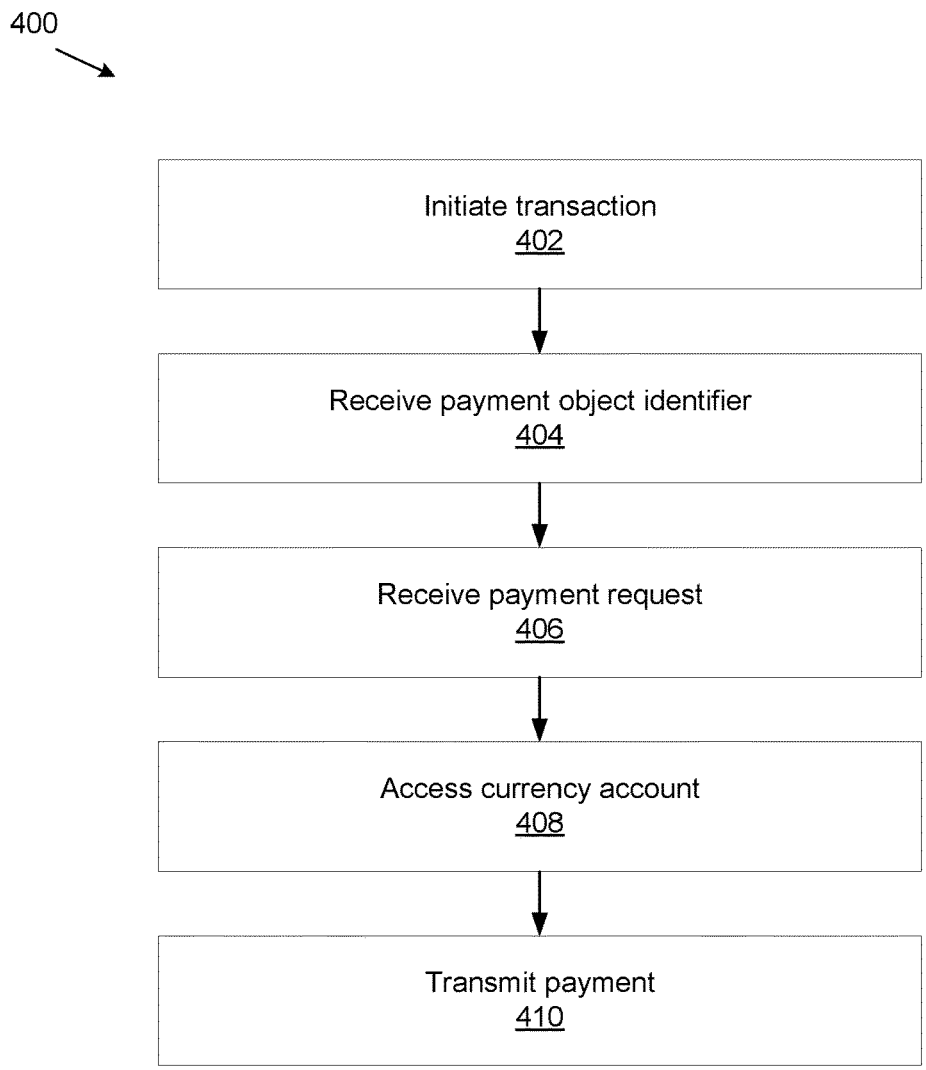
FIG. 4 shows another example workflow performed by the server device of FIG. 2.

At 314, payment from the currency account is transmitted as a response to the payment request. Based on one or more authorization credentials included with the NFT or other payment object, transmission of funds to the sender of the payment request are authorized. Transmission and authorization based on the credentials may be performed by a system owned by a financial institution maintaining the currency account. Transmission to the payment requester and submission of the credentials to a financial institution maintaining the currency account may be performed by an intermediary Referring now to FIG. 4, an example method 400 of implementing an NFT as a metaverse payment object is illustrated. Example method 400 is one example alternative to the example method 300. The steps of methods 300 and 400 may be combined or rearranged according to the circumstances in which the method is applied.

At 402, a currency transaction is initiated by a user in the metaverse.

In an example, the transaction may be initiated by a retailer or another third-party service provider. The transaction may be initiated by the submission of a payment request, such as for services rendered or a request for a prepayment to be made in prepared of services to be rendered. In examples, a payment request may be accompanied by a validation or verification of the retailer or service provider. For instance, service providers requesting prepayment may provide a validation showing the provider is a vetted provider. In some examples, the validation may be an NFT associated with the provider and traceable to a vetting service or platform.

In another example, the transaction may be initiated by the user. The transaction may be initiated to withdraw funds outside of a particular purchase transaction, for example, such as at an ATM.

At 404, a payment object identifier is received. The payment object identifier is associated with a particular payment object. The payment object identifier may a ledger entry identifying or otherwise describing an NFT payment object. The payment object identifier may be a unit of data which makes up the NFT payment object.

In a retail scenario, receipt of the payment object identifier may be by presentation of an NFT payment object to the retailer by the customer. The payment object identifier may be introduced to the system directly, such as by swiping or otherwise presenting the NFT to the system, while obscuring the identifier from the retailer themselves. In an ATM scenario, receipt of the payment object identifier may be by presentation of an NFT payment object to an ATM machine.

At 406, a payment request is received. The payment request identified an amount to be paid and a recipient to receive the payment. The payment request may include the payment object or payment object identifier, or the payment object may be identified separate, either before or after, the payment request is received. The payment request may identify the goods or services being purchased.

In a retail scenario, a payment request may be issued by the retailer's transaction system. In an ATM scenario, a payment request may be issued by the ATM following the user entering an amount of funds to be dispensed.

At 408, credentials associated with the payment object are used to access a currency account associated with the payment object. Submission of credentials and request for payment according to the payment amount may include verifying the status of the account and the sufficiency of the balance therein.

The payment object may include authorization credentials. For example, an NFT payment object may have authorization credentials stored in the ledger recording the NFT or may have an indicator pointing to authorization credentials stored in another storage location. Access credentials for an associated account may be stored within the payment object identifier, such as within the blockchain in the case of an NFT. Access credentials may be stored elsewhere, with the payment object identifier provided directions or another indicator to the location of the access credentials.

At 410, payment from the currency account is transmitted in response to the payment request. The payment may be directed to the same system issuing the payment request, or the payment request may include directions indicating payment be directed to another system or associated account.

Additionally, as will be understood by those in the art, use of an NFT as a payment object in the metaverse will have other applications. For example, a user may purchase tickets to a metaverse event using an NFT payment object or a real-world payment object, such as a credit card, for which the user also has a tokenized digital object of for their metaverse avatar. The user may then use the NFT payment object to gain access to the metaverse event.

The principles of the present disclosure will be applicable in other contexts as well. For example, an NFT may be minted to demonstrate access credentials to particular spaces rather than, or in addition to, a particular account. Similar to the presentation of a payment object NFT as a ticket to enter an event, when the NFT was used to purchase a ticket to the event, an NFT may serve as a unique key or access pass to membership or other exclusive or private spaces within the metaverse.

Figure 5:
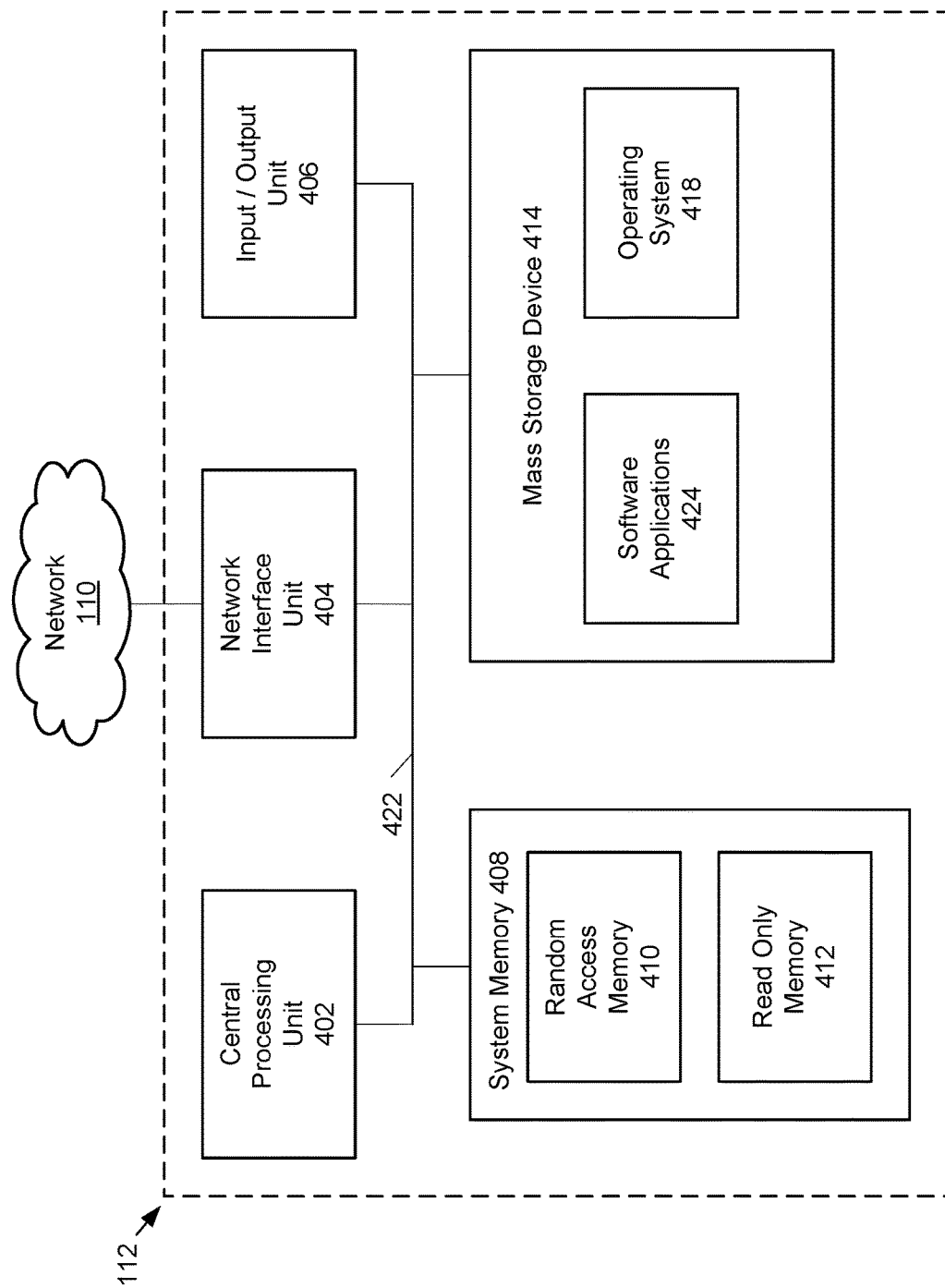
FIG. 5 shows example physical components of the server device of FIG. 2.

As illustrated in the embodiment of FIG. 5, the example server device 112, which provides the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server device 112, such as during startup, is stored in the ROM 512. The server device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 504 connected to the system bus 522. It should be appreciated that the network interface unit 504 may also be utilized to connect to other types of networks and remote computing systems. The server device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server device 112 can store software instructions and data. The software instructions include an operating system 518 suitable for controlling the operation of the server device 112. The mass storage device 514 and/or the RAM 510 also store software instructions and applications 524, that when executed by the CPU 502, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for implementing a non-fungible token (NFT) as a payment object in a metaverse space, comprising:
   one or more processors; and
   non-transitory computer-readable storage media encoding instructions which, when executed by the one or more processors, causes the computer system to create:
   a mint engine programmed to:
      generate an NFT having a unique visual appearance, the NFT being associated with a currency account and including an authorization credential for the currency account; and
      project a viewable digital version of the NFT in the metaverse space as a projection, wherein the projection of the NFT is associated with an avatar associated with a user who owns the NFT;
   a ledger engine programmed to maintain the NFT on a ledger;
   a wallet engine programmed to:
      generate a presentation of the NFT in response to a user request, wherein the presentation includes the visual appearance projection of the NFT to provide a visual representation of the authorization credential; and
      provide the projection of the NFT to the user; and
   a transaction engine programmed to:
      access the currency account, based on the authorization credential, in response to a payment request; and
      authorize payment of the payment request from the currency account based on the authorization credential.

2. The computer system of claim 1, wherein the NFT is a digital representation of a physical object owned by the user.

3. The computer system of claim 1, wherein the ledger is a blockchain ledger.

4. The computer system of claim 1, wherein the NFT is further associated with one or more payment preferences.

5. The computer system of claim 4, wherein the transaction engine is further programmed to access the one or more payment preferences and to respond to the payment request in accordance with the one or more payment preferences.

6. The computer system of claim 1, wherein the transaction engine is further programmed to convert currencies between a first currency associated with the payment request and a second currency associated with the currency account.

7. The computer system of claim 1, wherein the mint engine is further programmed to generate a key NFT, the key NFT being associated with a metaverse space and including access credentials for the metaverse space.

8. The computer system of claim 7, wherein the transaction engine is further programmed to permit the avatar associated with the key NFT to access the metaverse space based on the access credentials.

9. The computer system of claim 1, wherein the transaction engine is further programmed to maintain a record of transactions associated with the NFT.

10. The computer system of claim 1, wherein the presentation of the NFT is visible only to a user having ownership of the NFT.

11. The computer system of claim 1, further comprising an auxiliary engine programmed to identify transactional benefits associated with the NFT.

12. The computer system of claim 11, wherein the transactional benefits associated with the NFT are further associated with a particular purchase.

13. A method for implementing a non-fungible token (NFT) as a payment object in a metaverse space, comprising:
   receiving, from a user in the metaverse, a request to access a wallet associated with the user;
   generating a presentation of a contents of the wallet, wherein the contents of the wallet include at least one NFT, the at least one NFT having a unique visual appearance and being associated with a currency account and including an authorization credential for the currency account, wherein the presentation includes the visual appearance of the NFT to provide a visual representation of the authorization credential;
   projecting a viewable digital version of the NFT in the metaverse space as a projection, wherein the projection of the NFT is associated with an avatar associated with a user who owns the NFT;
   receiving, from the user, a selection of the at least one NFT;
   receiving a payment request including the at least one NFT; and
   authorizing payment of the payment request from the currency account based on the authorization credential.

14. The method of claim 13, wherein the currency account is one of a digital currency account or a fiat currency account.

15. The method of claim 13, wherein the payment request is associated with one of a digital currency or a fiat currency.

16. The method of claim 13, wherein the payment request is associated with a digital currency and the currency account is a fiat currency account and wherein the method further comprises:
   converting the fiat currency to the digital currency.

17. The method of claim 13, further comprising retrieving the at least one NFT from a ledger, in response to receiving a selection of the at least one NFT.

18. The method of claim 13, wherein the contents of the wallet include at least two NFTs, wherein one of the at least two NFTs is a key NFT, wherein the key NFT is associated with a metaverse space and include an access credential for the metaverse space.

19. The method of claim 13, further comprising identifying one or more transactional benefits associated with the NFT, wherein the one or more transactional benefits associated with the NFT are further associated with a particular purchase.

20. A system comprising:
- a computer-readable memory storing executable instructions; and
- one or more processors in communication with the computer-readable memory, wherein, when the one or more processors execute the executable instructions, the one or more processors perform:
  - receiving, from a user in the metaverse, a request to access a wallet associated with the user;
  - generating a presentation of a contents of the wallet, wherein the contents of the wallet include at least one NFT, the at least one NFT having a unique visual appearance and being associated with a currency account and including an authorization credential for the currency account, wherein the presentation includes the visual appearance of the NFT to provide a visual representation of the authorization credential;
  - projecting a viewable digital version of the NFT in the metaverse space, wherein the projection of the NFT is associated with an avatar associated with a user who owns the NFT;
  - receiving, from the user, a selection of the at least one NFT;
  - receiving a payment request including the at least one NFT; and
  - authorizing payment of the payment request from the currency account based on the authorization credential.

* * * * *